(12) United States Patent
Ogawa

(10) Patent No.: US 8,463,049 B2
(45) Date of Patent: Jun. 11, 2013

(54) IMAGE PROCESSING APPARATUS AND IMAGE PROCESSING METHOD

(75) Inventor: Kaname Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 890 days.

(21) Appl. No.: 12/139,741

(22) Filed: Jun. 16, 2008

(65) Prior Publication Data

US 2009/0010501 A1 Jan. 8, 2009

(30) Foreign Application Priority Data

Jul. 5, 2007 (JP) ................................. 2007-177007

(51) Int. Cl.
*G06K 9/62* (2006.01)

(52) U.S. Cl.
USPC .......................................... 382/216; 382/159

(58) Field of Classification Search
None
See application file for complete search history.

(56) References Cited

U.S. PATENT DOCUMENTS

| 6,934,332 | B1 * | 8/2005 | Auyeung et al. | ......... 375/240.16 |
|---|---|---|---|---|
| 2002/0102024 | A1 | 8/2002 | Jones et al. | |
| 2004/0234136 | A1 * | 11/2004 | Zhu et al. | ................. 382/224 |
| 2005/0280809 | A1 * | 12/2005 | Hidai et al. | ............... 356/237.3 |
| 2006/0110030 | A1 * | 5/2006 | Sung | ............................. 382/159 |
| 2006/0133672 | A1 | 6/2006 | Li | |
| 2008/0080744 | A1 * | 4/2008 | Tanaka | .......................... 382/118 |

FOREIGN PATENT DOCUMENTS

| JP | 2003-30667 | A | 1/2003 |
|---|---|---|---|
| JP | 2005-44330 | A | 2/2005 |
| JP | 2005-108197 | A | 4/2005 |
| JP | 2005-157679 | | 6/2005 |
| JP | 2006-268825 | A | 10/2006 |
| JP | 2007-25900 | A | 2/2007 |
| JP | 2007-26308 | A | 2/2007 |
| JP | 2007-65766 | A | 3/2007 |
| JP | 2007-102401 | A | 4/2007 |
| JP | 2007-226424 | A | 9/2007 |
| TW | 200529093 | A | 9/2005 |
| TW | 200707313 | A | 2/2007 |
| TW | 200719871 | A | 6/2007 |
| WO | WO 2006/001525 | A1 | 1/2006 |
| WO | WO 2006030519 | A1 * | 3/2006 ..................... 382/118 |

OTHER PUBLICATIONS

Everingham, Regression and Classification Approaches to Eye Localization in Face Images, 2006, Proceedings of the 7th International Conference on Automatic Face and Gesture Recognition (FGR'06), p. 1-6.*
U.S. Appl. No. 12/104,036, filed Apr. 16, 2008, Ogawa.
U.S. Appl. No. 12/190,998, filed Aug. 13, 2008, Ogawa.

(Continued)

*Primary Examiner* — Andrew W Johns
*Assistant Examiner* — David F Dunphy
(74) *Attorney, Agent, or Firm* — Oblon, Spivak, McClelland, Maier & Neustadt, L.L.P.

(57) ABSTRACT

An image processing apparatus for processing an image including an image of a face includes: a normalization unit configured to normalize the image including the image of a face so that the size of the face becomes a predetermined face size; a detection area setting unit configured to set an area smaller than the image normalized by the normalization unit as a detection area in which a position of a face part of the face is detected; and a detection unit configured to detect the position of the face part in the detection area set by the detection area setting unit.

23 Claims, 12 Drawing Sheets

OTHER PUBLICATIONS

Xin Geng, et al., "Image Region Selection and Ensemble for Face Recognition", Journal of Computer Science and Technology, Kluwer Academic Publishers, vol. 21, No. 1, Jan. 1, 2006, XP019217139, pp. 116-125.

Paul Viola et al "Rapid Object Detection using a Boosted Cascade of Simple Features", Accepted Conference on Computer Vision and Pattern Recognition 2001, pp. 1-9.

U.S. Appl. No. 13/354,852, filed Jan. 20, 2012, Ogawa.

Office Action issued Mar. 28, 2012 in Taiwan Patent Application No. 097122547, with English Translation.

Everingham et al., "Regression and Classification Approaches to Eye Localization in Face Images", Proceedings of the $7^{th}$ International Conference on Automatic Face and Gesture Recognition (FGR '06), IEEE Computer Society, 2006. (in English).

* cited by examiner

IMAGE PROCESSING APPARATUS AND IMAGE PROCESSING METHOD

CROSS REFERENCES TO RELATED APPLICATIONS

The present invention contains subject matter related to Japanese Patent Application JP 2007-177007 filed in the Japanese Patent Office on Jul. 5, 2007, the entire contents of which are incorporated herein by reference.

BACKGROUND OF THE INVENTION

1. Field of the Invention

The present invention relates to image processing apparatuses and image processing methods for detecting and recognizing a face image included in a captured image, and, more particularly, to an image processing apparatus and an image processing method for detecting the positions of parts of a face such as the centers, inner corners, and outer corners of eyes, a nose, the lower end and sides of the nose, a mouth, the ends of the mouth, eyebrows, and the inner corners and outer corners of the eyebrows from a face image detected from an input image.

More specifically, the present invention relates to image processing apparatuses and image processing methods for detecting the positions of parts of a face from a face image using a detector employing a statistical learning algorithm such as Adaboost, and, more particularly, to an image processing apparatus and an image processing method for detecting the positions of parts of a face such as eyes from a face image detected by face detection with smaller amounts of computation and memory.

2. Description of the Related Art

Face recognition techniques can be widely applied to man-machine interfaces such as a personal identification system that does not impose a burden on users and a sex determination system. In recent years, face recognition techniques have been used for automization of camera work for subject detection or subject recognition in a digital camera, for example, automatic focusing (AF), autoexposure (AE), automatic setting of the angle of view, or automatic photographing.

In a face recognition system, for example, face detection for detecting the position of a face image and extracting the detected face image as a detected face, face part detection for detecting main parts of a face from the detected face, and face recognition for recognizing the detected face (specifying a person) are performed. In the face detection, the size and position of a face image are detected from an input image and the detected face image is extracted as a detected face. In the face part detection, face parts are detected from the detected face. The face parts include the centers, inner corners, and outer corners of eyes, a nose, the lower end and sides of the nose, a mouth, the ends of the mouth, eyebrows, and the inner corners and outer corners of the eyebrows. After position adjustment and rotation compensation have been performed on the basis of the detected positions of the detected face parts, in the face recognition, recognition of the detected face (specification of a person) is performed.

Many methods of detecting a face from a complex image scene using only a density pattern of an image signal have been proposed. For example, a detector employing a statistics learning algorithm such as Adaboost can be used for the above-described face detection.

Adaboost was proposed by Freund et al. in 1996 as a theory in which a "strong classifier" can be obtained by combining many "weak classifiers (also called Weak Learners) that perform slightly better than random guessing". Each weak classifier may be a filter such as the Haar basis function, and is generated in such a manner that a weight a is assigned to the result of classification that a previously generated weak classifier is not good at. The reliability of each weak classifier is obtained, and, on the basis of the obtained reliability of each weak classifier, a majority vote is performed.

Here, it can be assumed that various sized faces are included in an input image (see, FIG. 9). Accordingly, it is necessary to cut out various sized search windows so as to determine whether a face is included in each of the cutout search windows.

As a method of handling the problem of the relationship between the resolution of an image and the size of a detected face, a method of fixing the resolution of an image (that is, a method of preparing various face detectors for various sized faces included in an input image) and a method of fixing the size of a detected face (that is, a method of variously reducing the resolution of an input image for detection using a single face detector having a fixed detectable face size). The latter is more realistic than the former. A window (hereinafter also referred to as "search window") of the same size as a learning sample is usually cut out from each image obtained by converting the scale of an input image so as to search for different sized search windows. That is, since the size of a face included in the input image cannot be determined, it is necessary to cause a face detector to scan the input image each time the resolution of the input image is changed. From each image obtained by changing the resolution of the input image, only a face of a size near the fixed detectable face size of the face detector can be detected (see, FIG. 10).

However, for example, an input image composed of 320× 240 pixels includes search windows of approximately 5,000 sizes, and weak discriminators take a long time to perform arithmetic operations on all the window sizes. Accordingly, some methods of enhancing the speed of the arithmetic operation of the weak discriminator have been proposed.

For example, a method of rapidly calculating a weak hypothesis using rectangle features and images called integral images is known (see, for example, United States Unexamined Patent Application Publication No. 2002/0102024 and Paul Viola, Rapid Object Detection using a Boosted Cascade of Simple Features (CVPR 2001)).

Furthermore, an object detection device is disclosed in which, at the time of the majority vote, a window image is determined to be a non-object using obtained calculation results even in the course of calculation without waiting until all weak discriminators individually output calculation results and then further calculation is canceled. In such an object detection device, a threshold value used to cancel calculation is learnt in a learning session (see, for example, Japanese Unexamined Patent Application Publication No. 2005-157679). As a result, the amount of computation in the process of detecting an object can be markedly reduced.

SUMMARY OF THE INVENTION

A detector employing the Adaboost algorithm can detect a face from a complex image scene using only a gradation pattern of an image signal of the scene. The inventors consider that this kind of detector can also be applied to detection of face parts.

If a face detection method illustrated in FIG. 10 is applied to detection of face parts, a face part detector of a fixed size is caused to scan each face image detected from an input image while changing the resolution of the face image (see, for example, FIG. 11). That is, the resolution of each face image detected by a face detector is changed, and the face image is scanned by the face part detector, so that only a face part of resolution near the fixed size of the face part detector is detected.

In such a face part detection method, however, it is necessary to change the resolution of each face image extracted from an input image and cause a face part detector to scan the extracted face image each time the resolution of the face image is changed. This leads to consumption of large amounts of computation and memory.

It is desirable to provide an excellent image processing apparatus and an excellent image processing method capable of detecting the positions of face parts such as the centers, inner corners, and outer corners of eyes, a nose, the lower end and sides of the nose, a mouth, the ends of the mouth, eyebrows, and the inner corners and outer corners of the eyebrows from a face image detected from an input image.

It is further desirable to provide an excellent image processing apparatus and an excellent image processing method capable of detecting the positions of face parts from a face image using a detector employing a statistical learning algorithm such as Adaboost.

It is still further desirable to provide an excellent image processing apparatus and an excellent image processing method capable of detecting the positions of face parts such as eyes from a face image detected by face detection with smaller amounts of computation and memory.

An image processing apparatus according to an embodiment of the present invention processes an image including an image of a face. The image processing apparatus includes: a normalization unit configured to normalize the image including the image of a face so that the size of the face becomes a predetermined face size; a detection area setting unit configured to set an area smaller than the image normalized by the normalization unit as a detection area in which a position of a face part of the face is detected; and a detection unit configured to detect the position of the face part in the detection area set by the detection area setting unit.

As a method of detecting a face from a complex image scene using only a density pattern of an image signal, a method of using a detector employing a statistics learning algorithm such as Adaboost is known. Since it is assumed that an input image includes various sized faces, a method of variously changing the resolution of the input image so as to cause a single detector having a fixed detectable face size to perform face detection each time the resolution of the face image is changed is known.

Processing for further detecting the position of a face part such as an eye from a face image detected by the face detection basically corresponds to the processing for detecting a face image from a complex image scene using only a density pattern of an image signal. Accordingly, a face part detection method using the above-described statistical learning algorithm such as Adaboost can be considered.

However, in order to dissolve the relationship between the resolution of an image and the size of a detected face, it is necessary to variously change the resolution of a face image obtained by the face detection and cause a face part detector to perform scanning each time the resolution of the face image is changed. This leads to large amounts of computation and memory. Alternatively, there is a method of preparing a plurality of face part detectors of different sizes instead of variously changing the resolution of a face image. However, this method is impractical.

Accordingly, in an image processing apparatus according to an embodiment of the present invention, using the fact that the approximate size of a face can be determined by performing the face detection before the face part detection is performed, a face image obtained by the face detection is enlarged or reduced so that the size of a target face part included in the face image becomes an appropriate size detectable to a face part detector. That is, the face image is normalized in advance so that the resolution of the target face part is the same as the resolution of the face part detector. Subsequently, using only the face part detector of a fixed size, the face part is detected from the normalized face image.

Accordingly, according to an embodiment of the present invention, the face part detector scans only a single normalized face image including the image of a detected face detected by the face detector. That is, it is not necessary to variously change the resolution of each detected face and perform scanning each time the resolution is changed. As a result, the required amounts of computation and memory can be markedly reduced. Furthermore, since the number of scanning operations can be reduced, the speed of the face part detection can be enhanced.

An image processing apparatus according to an embodiment of the present invention rapidly detects the position of a target face part such as an eye. The detection area setting unit sets an area smaller than the normalized face image as a detection area in which the position of the eye is detected.

The detection unit defines a difference between luminance levels of at least two pixels included in the detection area as a weak hypothesis, and detects the position of the face part in the detection area using a final hypothesis defined using weak hypotheses obtained in advance by statistical learning.

More specifically, in an application area of the detection unit composed of, for example, 24×24 pixels, the detection unit sets a plurality of sets (for example, only several hundreds of sets) of two pixels between which there is a luminance level difference allowing easy extraction of a feature of a face part such as an eye, calculates a difference between luminance levels of two pixels included in each of the sets of two pixels, defines the calculation result as a weak hypothesis for the two pixels, and defines a final hypothesis using weak hypotheses obtained in advance by statistical learning. The group of the defined weak hypotheses each of which is a difference between luminance levels of two pixels included in 24×24 pixels is registered as a face part detection dictionary.

The statistical learning is performed using a face image of the same resolution as the resolution of the face image normalized by the normalization unit.

At the time of detection of a face part, a detector employing the above-described face part detection dictionary scans the face image detected by a face detector. At each scanning position, the difference between luminance levels of two pixels, which are included in each of the sets of two pixels and for which a weak hypothesis is defined, is calculated. It is determined whether the calculation result matches the weak hypothesis for the two pixels. A sore for the two pixels is determined on the basis of the determination result. On the basis of the sum of scores for all the sets of two pixels for which a weak hypothesis is defined, it can be determined whether the scanning position is the position of the target face part.

As described previously, in the present invention, the size of a face image is normalized to a predetermined size in advance. Accordingly, using only a face part detector of a fixed size of, for example, 24×24 pixels, a face part can be detected from the normalized face image. Since the detection area setting unit sets an area smaller than the normalized face image as a detection area for the face part (for example, when a left eye is detected, an area which is smaller than the face image and in which the left eye is likely to exist is set as a scanning area of the detector instead of the entire area of the face image), the amounts of computation and memory required for face part detection can be reduced. As a result, the position of a target face part can be rapidly detected.

If the statistical learning is performed so that the score of a target face part becomes a positive value, the detection unit can determine that one of all the scanning positions having the highest positive score is the position of the target face part.

In order to calculate a score at each scanning position, it is necessary to obtain the differences between luminance levels of two pixels included in all the sets of two pixels for which a weak hypothesis is defined. If score calculation is performed upon the entire area of the face part detection area when there are several hundreds of weak hypotheses, the large amount of computation is required. On the other hand, in the process of increasing the number of weak hypotheses, it can be estimated whether there is the possibility that the scanning position is the position of the target face part.

In this case, a score limit value, which indicates that there is no longer any possibility that the scanning position is the position of the target face part and is associated with the number of weak hypotheses, may be set by the statistical learning so as to reduce the number of weak hypotheses for which a face part detector performs computation. The limit value can be set on the basis of the lowest score associated with the number of weak hypotheses obtained from all pieces of input learning data. During calculation of a score at a certain scanning position, a score obtained from a certain number of weak hypotheses is compared with a corresponding limit value. If the score is lower than the corresponding limit value, it can be considered that the scanning position is very unlikely to be the position of the target face part. Accordingly, the subsequent score calculation is canceled, and a result representing that the scanning position is not the position of the target face part is returned.

The detection unit is not required to scan at all points (X,Y) in the face part detection area (the area smaller than the entire area of a face image). By performing high-speed scanning by thinning out scanning positions at which score calculation is to be performed, a processing time required for face part detection can be reduced.

If a high score is calculated at a certain scanning position, there is a high possibility that the scanning position or an adjacent scanning position is the position of a target face part. However, in the above-described high-speed scanning in which scanning is performed at every other point, the granularity of face part detection is coarse.

Accordingly, if a score higher than a predetermined value is calculated at a scanning position, score calculation is also performed at positions adjacent to the scanning position, at which score calculation is not performed by default, so as to set a position having the highest positive score as the position of a target face part. As a result, a processing speed can be enhanced, and the accuracy of detection can be maintained.

The target face part is each of left and right eyes. The normalization unit normalizes the position, size, and angle of the face image input from an input unit on the basis of the positions of both eyes detected by the detection unit and uses the normalization result for face recognition or another application.

A method of normalizing a face image using information about the position of a face part other than both eyes can also be considered. However, as compared with other face parts, a face image can be more accurately normalized using the positions of both eyes, because there is little difference in the distance between left and right eyes among individuals.

According to an embodiment of the present invention, there is provided an excellent image processing apparatus and an excellent image processing method capable of detecting the position of a face part from a face image using a detector employing a statistical learning algorithm such as Adaboost.

According to an embodiment of the present invention, there is further provided an excellent image processing apparatus and an excellent image processing method capable of detecting the position of a face part such as an eye from a face image detected by face detection with smaller amounts of computation and memory.

Since an image processing apparatus according to an embodiment of the present invention normalizes the size of a face image to a predetermined size in advance, it can detect a face part from the normalized face image using only a single face part detector of a fixed pixel size. Furthermore, since an area smaller than the normalized face image is set by the detection area setting unit as a detection area for the face part (for example, when a left eye is detected, an area which is smaller than the face image and in which the left eye is likely to exist is set as a scanning area of the detector instead of the entire area of the face image), the amounts of computation and memory required for face part detection can be reduced. As a result, the position of the face part can be rapidly detected.

According to an image processing apparatus according to an embodiment of the present invention, a score limit value is set for the number of weak hypotheses by performing statistical learning. During score calculation at a certain scanning position, when a score obtained from a certain number of weak hypotheses is lower than the corresponding limit value, subsequent score calculation is canceled. As a result, the cost required for score calculation can be reduced, and the speed of the face part detection can be enhanced. By thinning out scanning positions at which score calculation is to be performed and performing score calculation near a scanning position at which a high score is calculated without thinning out scanning positions, the amount of computation can be markedly reduced to achieve rapid face part detection and the decrease in accuracy of detection can be prevented.

Other objects, characteristics, and advantages of the present invention will become apparent from more detailed descriptions based on the following embodiment of the present invention and the accompanying drawings.

DESCRIPTION OF THE PREFERRED EMBODIMENTS

An embodiment of the present invention will be described in detail below with reference to the accompanying drawings.

Figure 1:
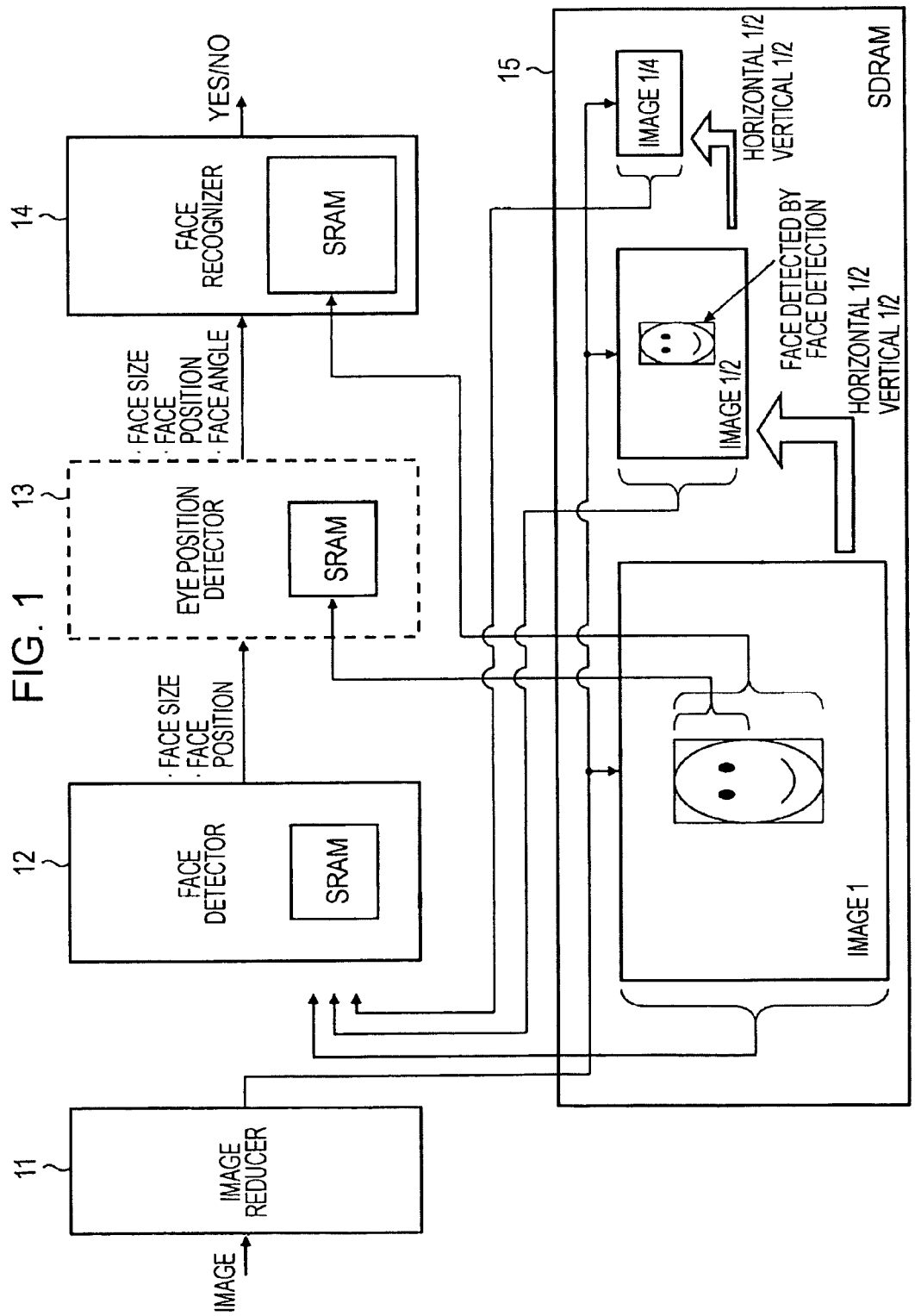
FIG. 1 is a diagram schematically illustrating an entire configuration of a face recognition system according to an embodiment of the present invention.

FIG. 1 schematically illustrates the entire configuration of a face recognition system according to an embodiment of the present invention. A face recognition system 1 illustrated in the drawing includes an image reducer 11, a face detector 12, an eye position detector 13, a face recognizer 14, and a memory (SDRAM) 15 for storing a plurality of images. Each of the face detector 12, the eye position detector 13, and the face recognizer 14 includes a local memory (SDRAM). For example, an image captured by a digital camera is input into the face recognition system 1, and a flag indicating whether the captured image of a person is the same as an image stored in advance (Yes/No) is output from the face recognition system 1.

The image reducer 11 reduces the horizontal and vertical sizes of an input image to ½ so as to create a reduced image, and stores the reduced image and the original input image in the SDRAM (Synchronous DRAM) 15. In an example illustrated in FIG. 1, the image reducer 11 creates three images, an image 1 that is the input image, an image ½ by reducing the horizontal and vertical sizes of the input image to ½, and an image ¼ by reducing the horizontal and vertical sizes of the input image to ¼, and stores the created images in the SDRAM 15.

At the time of creation of a reduced image, it is desirable that the image ½ and the image ¼ be directly created from the input image from the viewpoint of accuracy of computation. However, from the viewpoint of the size of hardware, a method of repeatedly performing reduction of an image to one-half its original size, that is, creating the image ½ from an input image (the image 1) and then creating the image ¼ from the image ½ may be used.

Figure 9:
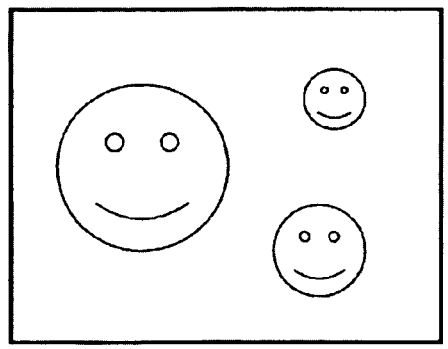
FIG. 9 is a diagram illustrating an input image including various sized faces.
Figure 10:
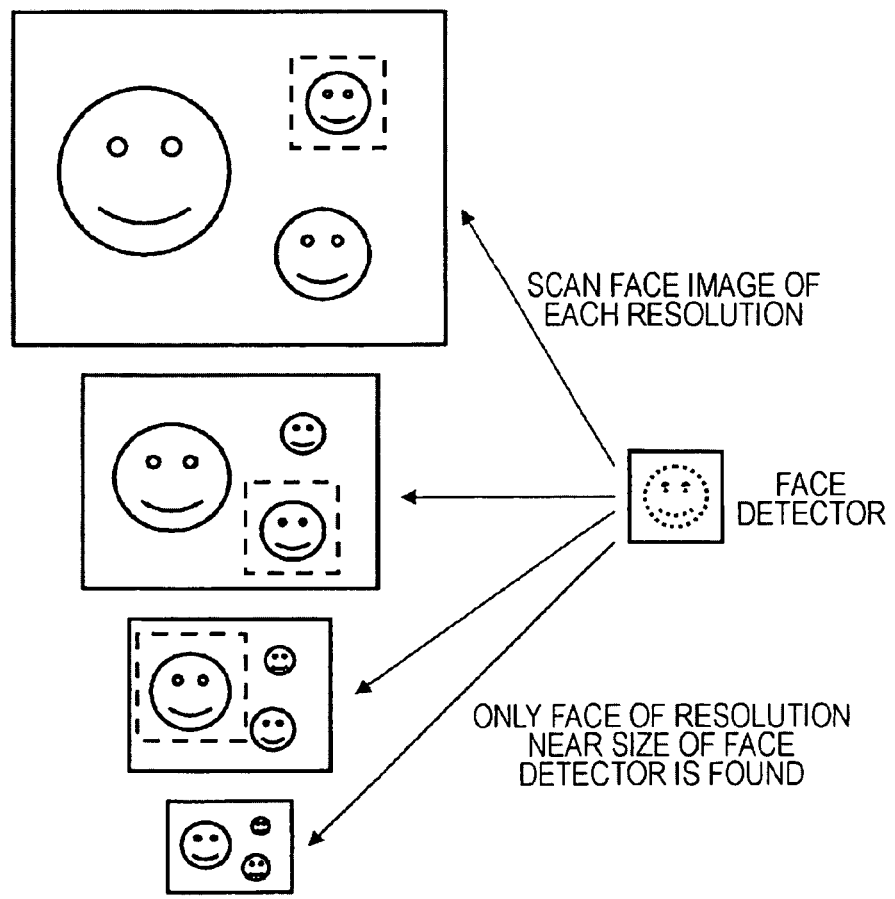
FIG. 10 is a diagram illustrating the scanning of an input image using a face detector while changing the resolution of the input image which is performed for detection of only a face having a resolution near the size of the face detector.

The face detector 12 detects a face from each of the input image and all the reduced images stored in the SDRAM 15, and obtains the size and position of the detected face. If processing speed is left out of consideration, the face position can be easily obtained by performing face detection upon the entire area of an image. On the other hand, in the case of the detection of various sized faces, as a method of handling the problem of the relationship between the resolution of an image and the size of a detected face (see, FIG. 9), a method of fixing the resolution of an image (that is, a method of preparing various face detectors for various sized faces included in an input image) and a method of fixing the size of a detected face (that is, a method of variously reducing the resolution of an input image for detection using a single face detector having a fixed detectable face size (see, FIG. 10)) can be considered. The latter is more realistic than the former. Accordingly, as illustrated in FIG. 1, the face detector 12 checks whether a face exists in an area of 24×24 pixels in each of the image 1 and the reduced images ½ and ¼ created by the image reducer 11.

If the number of reduction ratios such as ½ and ¼ is too small to accurately perform face detection, for example, the image reducer 11 may further create images 7/8, 6/8, and 5/8 using various reduction ratios of 7/8, 6/8, and 5/8 and the face detector 12 may perform face detection upon each of the created images.

In order to perform feature extraction in the face detection, a pixel difference method can be used. In this method, sets of two pixels, between which there is a luminance level difference allowing easy extraction of a face feature, are selected from among 24×24 pixels and the difference between luminance levels of two pixels is obtained in each of the sets of two pixels. The Adaboost algorithm may be used for computation of a classifier.

As a preparation for recognition of a face from a face image, the eye position detector 13 specifies positions of left and right eyes so as to normalize a face included in an image obtained by increasing the resolution of the face image detected by the face detector 12. That is, the eye position detector 13 detects the positions of the eyes so as to obtain, on the basis of the size and position of a face in a face image obtained by the face detection, the size, position, and angle of a face included in an image obtained by increasing the resolution of the face image.

In a specific embodiment of the present invention, left and right eyes are detected from a face image as face parts. The reason for this is that there is little difference in the distance between left and right eyes among individuals. It should be noted that various face parts such as the centers, inner corners, and outer corners of eyes, a nose, the lower end and sides of the nose, a mouth, the ends of the mouth, eyebrows, and the inner corners and outer corners of the eyebrows may be detected.

Like the case of the face detection, the pixel difference method can be used for feature extraction at the time of detection of positions of both eyes. Like the face detector 12, the eye position detector 13 performs the pixel difference method in the same area of 24×24 pixels. Accordingly, using the same hardware used by the face detector 12, continuous processing can be achieved. The Adaboost algorithm may be used for computation of a classifier.

In a detector composed of 24×24 pixels, a plurality of sets of two pixels (for example, only several hundreds of sets of two pixels), between which there is a luminance level difference allowing easy extraction of the feature of en eye, are selected. The differences between luminance levels of two pixels in the sets of two pixels are defined as weak hypotheses, and, using weak hypotheses obtained in advance by statistical learning, a final hypothesis is defined. Thus, the group of the weak hypotheses each of which is the difference between luminance levels of two pixels included in 24×24 pixels is used in an eye detector, and is registered as a face part detection dictionary. At the time of detection, the eye detector composed of 24×24 pixels is caused to scan the face image detected by the face detector 12. At each scanning position, the difference between the luminance levels of two pixels for which a weak hypothesis is defined is calculated. It is determined whether the calculation result matches the weak hypothesis. On the basis of the determination result, a score is determined. The sum of scores for all the sets of two pixels is defined as a final hypothesis. On the basis of the final hypothesis, it can be determined whether the scanning position is an eye position.

The feature of the present invention is that the position of a face part such as an eye, a mouth, or a nose is rapidly detected. The detailed description of face part detection, for example, detection of positions of both eyes, will be made later.

The face recognizer 14 obtains the size, position, and angle of a face from the face image in which the positions of left and right eyes are specified by the eye position detector 13 so as to normalize the face image detected by the face detector 12, stores the normalized face image in SRAMs included in 60×66 pixels, and determines whether the normalized face image is the same as a registered image.

A method of normalizing a face image using information about the position of a face part other than both eyes can also be considered. However, as compared with other face parts, a face image can be more accurately normalized using the positions of both eyes, because there is little difference in the distance between left and right eyes among individuals.

Gabor Filtering can be applied to feature extraction in face recognition performed by the face recognizer 14. It is known that human visual cells having selectivity for specific directions exist. The cells include cells responsive to vertical lines and cells responsive to horizontal lines. Similarly, a Gabor filter is a spatial filter formed by a plurality of filters having directional selectivity.

Gentleboost is used for computation of a classifier performed in the face recognizer 14. The degree of similarity between a result of processing performed on the normalized face image using a Gabor filter and a result of processing performed on the image registered in advance using a Gabor filter is obtained. Gentleboost is executed for the degree of similarity so as to determine whether the face image matches the registered image.

As described previously, as a method of detecting a face from a complex image scene using only a density pattern of an image signal, the face detector 12 employing a statistics learning algorithm such as Adaboost can be used. Since it is assumed that an input image includes various sized faces, the resolution of the input image is variously changed so as to cause a single detector having a fixed detectable face size to perform face detection each time the resolution of the face image is changed (see, FIG. 10).

The eye position detector 13 for detecting the positions of left and right eyes that are face parts uses the pixel difference method for feature extraction, and is a detector employing a statistics learning algorithm such as Adaboost.

Figure 11:
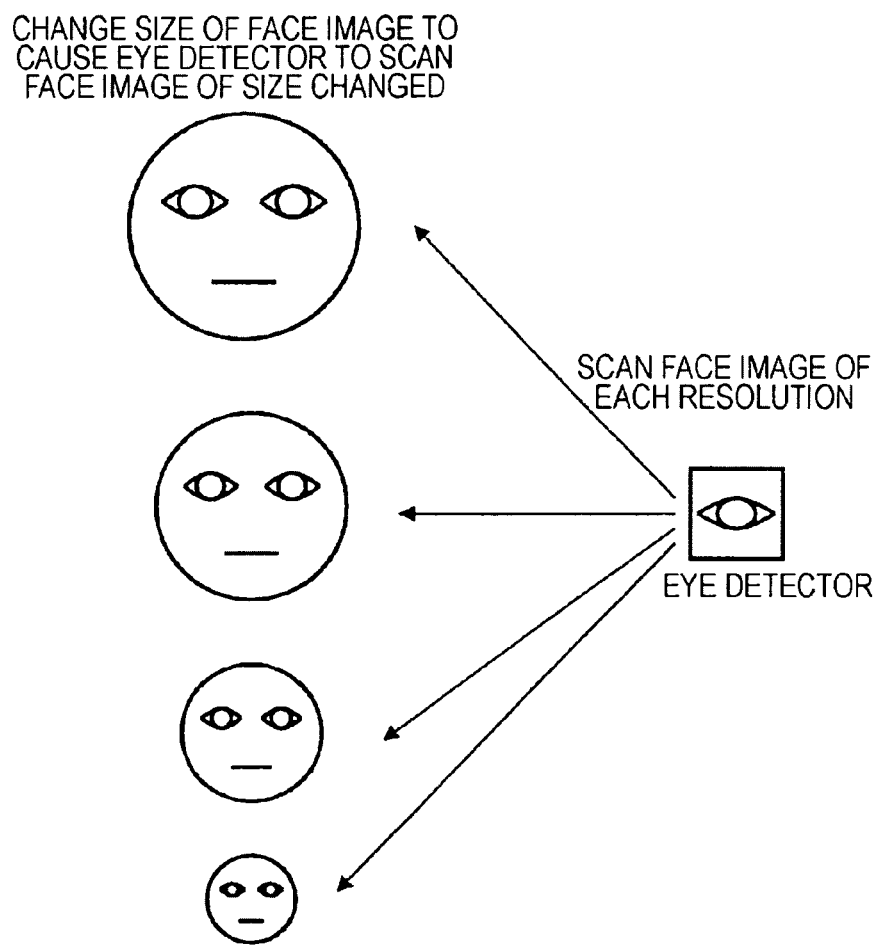
FIG. 11 is a diagram illustrating the scanning of a face image using a face part detector while changing the resolution of the face image which is performed for detection of only a face part having a resolution near the size of the face part detector.

In detection of the positions of both eyes, in order to dissolve the relationship between the resolution of an image and the size of a detected face, it is necessary to change the resolution of a face image detected by the face detector 12 and cause a face part detector to perform scanning each time the resolution of the face image is changed (see, FIG. 11). In this case, large amounts of computation and memory are required. Alternatively, a method of preparing a plurality of face part detectors of different sizes can be considered instead of the above-described method of changing the resolution of a face image. However, this is impractical.

In this embodiment, using the fact that an approximate size of a face can be obtained at the time of face detection performed by the face detector 12, a face image is normalized in advance so that the resolution of left and right eyes is the same as the resolution of an eye detector.

Figure 2:
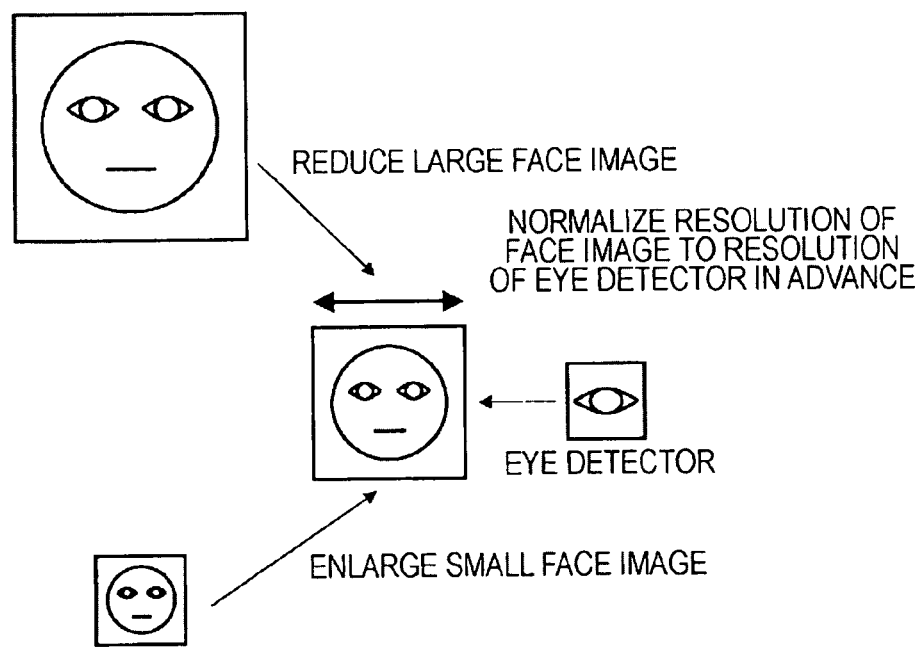
FIG. 2 is a diagram illustrating normalization of a face image which is performed in advance so that the resolution of left and right eyes is the same as the resolution of an eye detector prior to detection using the fact that the approximate size of a face can be obtained in face detection.

More specifically, if the size of an eye detector is 24×24 pixels, a face image is normalized so that the size of the face image becomes 80×80 pixels. In this case, using only a single eye detector of a fixed size of 24×24 pixels, the positions of eyes can be detected from the normalized face image of 80×80 pixels. That is, as illustrated in FIG. 2, if a face image output from the face detector 12 is large, the face image is normalized in advance so that the resolution of the face image is the same as the resolution of an eye detector. On the other hand, if the face image is small, the face image is enlarged. As a result, it is not required to scan images of a plurality of resolutions. This enables rapid eye detection.

Figure 3:
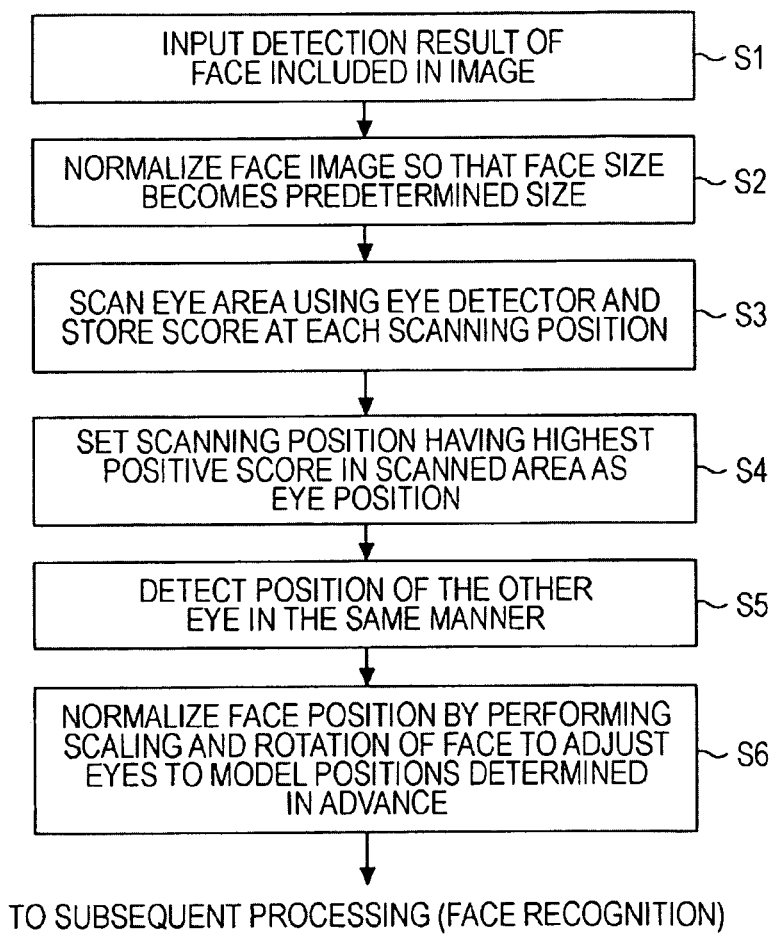
FIG. 3 is a flowchart schematically illustrating a process of normalizing a face image and performing face part detection.

FIG. 3 is a flowchart schematically illustrating a process of normalizing a face image and detecting eyes that are face parts.

Information about the size and position of a face included in an image to be processed is input from the face detector 12 (step S1). In preparation for eye detection, first, a face image is normalized so that the size of the face becomes a predetermined size (for example, each side of a face becomes 80 pixels) (step S2).

Subsequently, an area including eyes in the normalized face image is set as an eye detection area, and an eye detector performs scanning in this eye detection area (step S3).

The eye detector performs the pixel difference method, and the Adaboost algorithm is used for computation of a classifier. For example, the size of the eye detector is 24×24 pixels while the size of the face image is 80×80 pixels.

In the area of 24×24 pixels, the eye detector sets a plurality of sets of two pixels (for example, only several hundreds of sets of two pixels), between which there is a luminance level difference allowing easy extraction of an eye feature, defines the difference between luminance levels of two pixels in each of the sets of two pixels as a weak hypothesis, and defines a final hypothesis using weak hypotheses obtained by statistical learning performed in advance. Here, the statistical learning is performed so that the score of an eye (a target face part) becomes a positive value. At each scanning position in the eye detection area, the difference between luminance levels of two pixels, for which a weak hypothesis is defined, is calculated in each of the sets of two pixels. It is determined whether the calculation result matches the weak hypothesis to determine a score. The sum of scores determined as described previously is stored as a score at the scanning position.

After the eye detector has completed scanning of the predetermined eye detection area, a scanning position having the highest positive score is set as an eye position (step S4). In a case in which the statistical learning of a face part detector is performed so that the score of a target face part becomes a positive value, a position having the highest positive score can be considered as the position of the target face part.

As described previously, the position of one of eyes is detected. Subsequently, the position of the other one of eyes is similarly detected by performing the process from step S3 to step S4 (step S5).

After the positions of the eyes have been detected, the normalization of a face position is performed (step S6). In the normalization of a face position, scaling and rotation of the face are performed so that the eyes are adjusted to model eye positions determined in advance. As a result, a face image is obtained and is then used for an application at a subsequent stage, for example, a face recognition application.

FIG. 4 is a diagram schematically illustrating scanning of a normalized face image performed by a left eye detector.

Figure 4A:
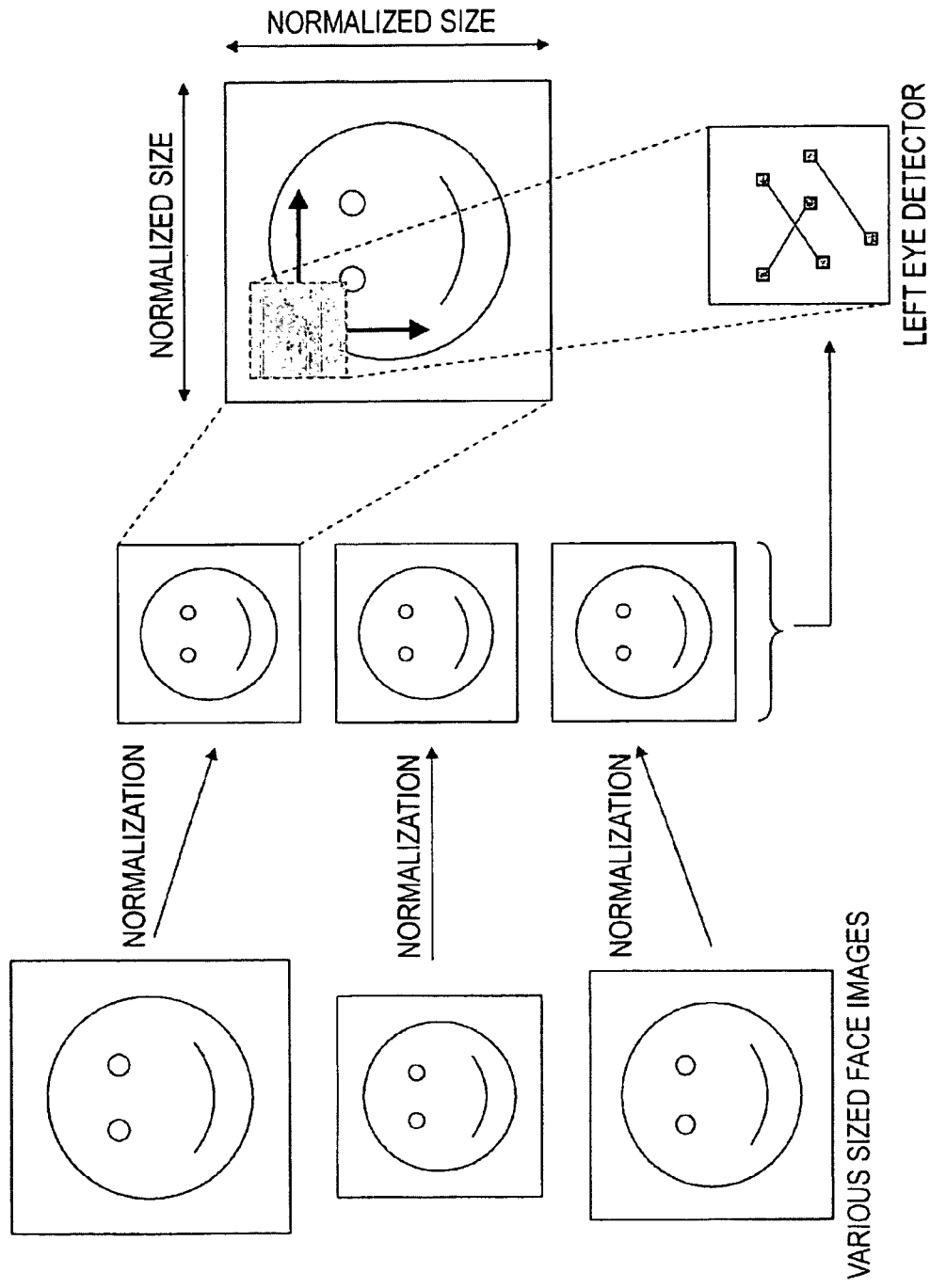
FIG. 4A is a diagram schematically illustrating scanning performed by a left eye detector after normalization of a face image.

As illustrated in FIG. 4A, it is assumed that face images of various resolutions are output from the face detector 12. At the time of detection of a face part such as a left eye, first, the size of a face image is normalized to a size determined in advance, for example, the size of 80×80 pixels. The left eye detector scans the normalized face image. The left eye detector defines the difference between luminance levels of at least two pixels as a weak hypothesis, and obtains a final hypothesis by combining many weak hypotheses.

Figure 4B:
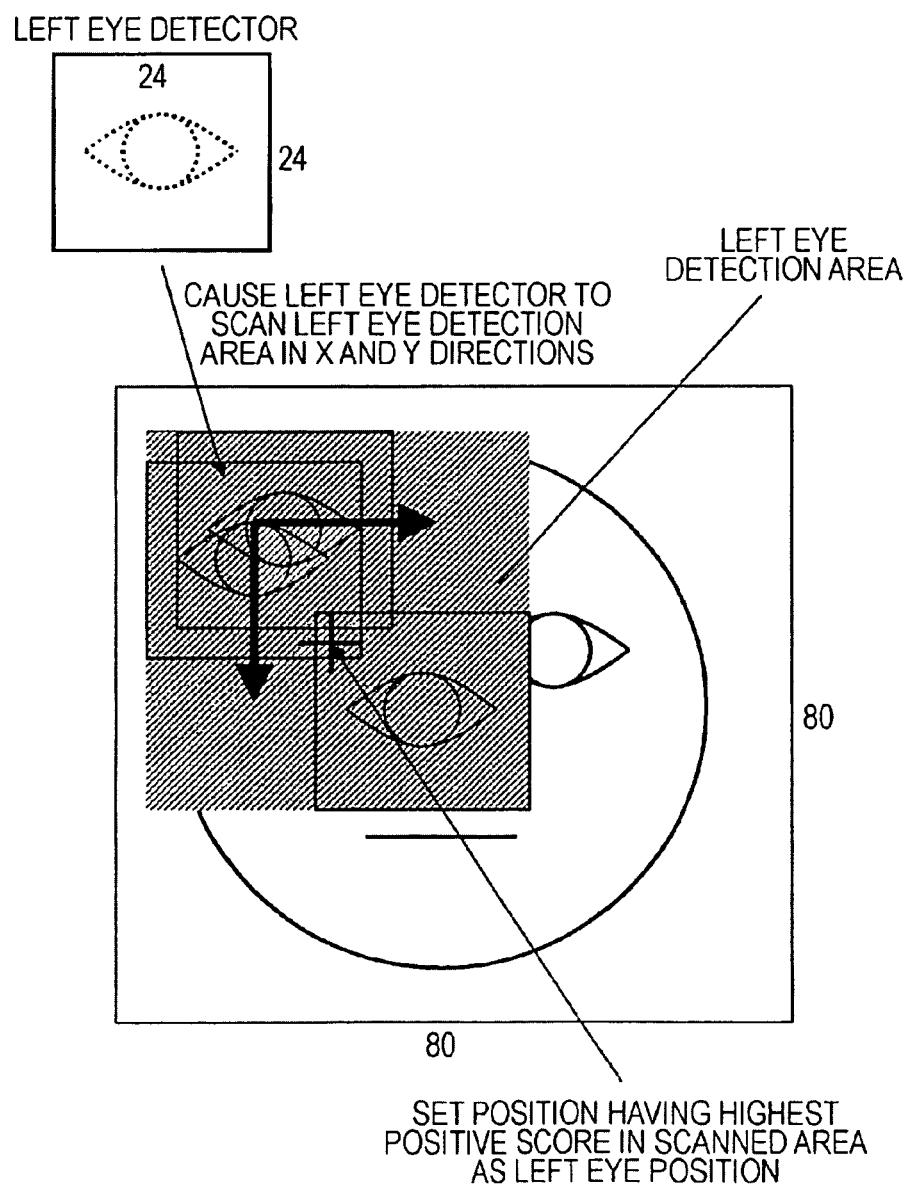
FIG. 4B is a diagram schematically illustrating scanning of a normalized face image using a left eye detector.

In this example, the size of the face image is normalized to the size of 80×80 pixels. However, the left eye detector may not scan the entire area of the normalized face image. As illustrated in FIG. 4B as a diagonally shaded area, an area in which the left eye is likely to exist is set in advance as a left eye detection area. This face part detection area is a fixed area smaller than the normalized face image.

The size of a face image is 80×80 pixels, while the size of an eye detector is 24×24 pixels. In the left eye detector employing Adaboost, statistical learning is performed so that a positive score is obtained at the position of the left eye. Accordingly, it can be considered that a position having the highest positive score, which is obtained after the left eye detector has scanned the above-described left eye detection area in X and Y directions, is the position of the target face part.

The left eye detector is not required to scan at all points (X, Y) in the left eye detection area. By thinning out scanning positions as appropriate, a processing time required for detection can be reduced. This will be described in detail later.

As illustrated in FIG. 1, if processing for recognizing a face image as a face is performed as an application at a subsequent stage, preparations for the face recognition are made. In the preparations for the face recognition, using a result of detection of both eyes performed by an eye detector functioning as a face part detector, on the basis of the size and position of a face in a face image detected by face detection, the size, position, and angle of a face in an image obtained by increasing the resolution of the face image are obtained. In a specific embodiment of the present invention, left and right eyes are detected from a face image as face parts. The reason for this is that there is little difference in the distance between left and right eyes among individuals. For example, as described previously, if the size of a face image is normalized to the size of 80×80 pixels, the width of each eye is 10 to 15 pixels, while the approximate distance between the eyes is 16 pixels.

FIG. 5 illustrates an exemplary configuration of a left eye detector. The left eye detector composed of 24×24 pixels performs the pixel difference method, and uses the Adaboost algorithm for computation of a classifier.

Figure 5A:
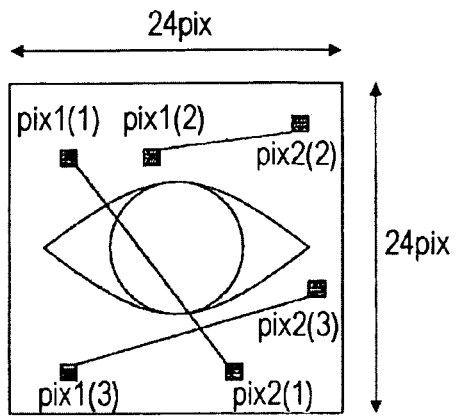
FIG. 5A is a diagram illustrating settings of a plurality of sets of two pixels pix1($t$) and pix2($t$), between which there is a luminance level difference allowing easy extraction of an eye feature, in a left eye detector composed of 24×24 pixels.

As illustrated in FIG. 5A, in the left eye detector composed of 24×24 pixels, a plurality of sets of two pixels pix1($t$) and pix2($t$) ($t$ is a positive integer of 1 to several hundreds of values), between which there is a luminance level difference allowing easy extraction of an eye feature, are set. A weak hypothesis representing that the difference between luminance levels of two pixels is lower than a threshold value $\theta(t)$ is defined for each set of the two pixels pix1($t$) and pix2($t$). Using weak hypotheses obtained by statistical learning in advance, a final hypothesis is defined. Here, the statistical learning is performed so that the score of the left eye becomes a positive value. Equation denoting a weak hypothesis is as follows.

$$h(t) \begin{cases} pix1(t) - pix2(t) < \theta(t) \\ \text{true: } h(t) = 1 \\ \text{false: } h(t) = -1 \end{cases}$$

The statistical learning is performed using a face image of the same resolution as that of a normalized face image.

Basically, a weak hypothesis is defined for a set of two pixels between which there is a luminance level difference allowing easy extraction of an eye feature. However, different degrees of eye feature are extracted from the sets of two pixels. A weight $\alpha(t)$ is therefore assigned to the set of the two pixels pix1($t$) and pix2($t$).

Figure 5B:
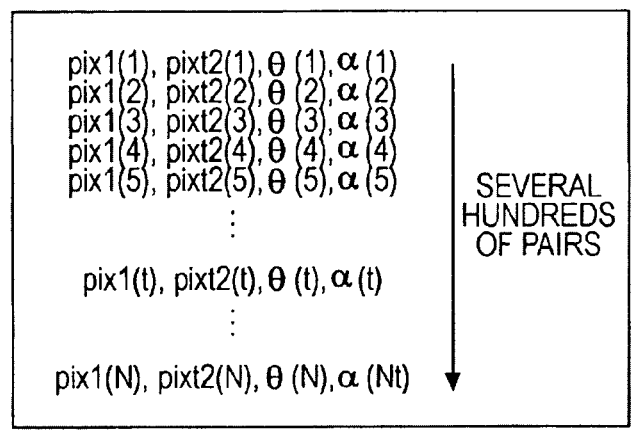
FIG. 5B is a diagram illustrating an exemplary configuration of a dictionary for face part detection.

Accordingly, for example, a dictionary for left eye detection contains pieces of information about positions of the pixels pix1($t$) and pix2($t$), the threshold value $\theta(t)$ for the difference between luminance levels of these pixels, and the weight $\alpha(t)$ (see, FIG. 5B). This dictionary is prepared using Adaboost.

At the time of detection, the difference between luminance levels of the two pixels pix1($t$) and pix2($t$) is calculated, it is determined whether the hypothesis of pix1($t$)−pix2($t$)<$\theta(t)$ is satisfied, and responses of h(t)=1 and h(t)=−1 are returned when the hypothesis is true and false, respectively.

The weak hypothesis h(t) is multiplied by the weight $\alpha(t)$ so as to obtain a score for the two pixels pix1($t$) and pix2($t$). The sum of scores for all sets of two pixels is defined as a final hypothesis at the scanning position. As described in the following equation, if statistical learning is performed so that the score of an eye becomes a positive value, it can be considered that a position having the highest positive score, which is obtained after the left eye detector has scanned the left eye detection area in the X and Y directions, is the position of a target face part.

$$\begin{cases} \sum_t h(t)\alpha(t) \geq 0: \text{ Eye position} \\ \sum_t h(t)\alpha(t) < 0: \text{ Not eye position} \end{cases}$$

Figure 5C:
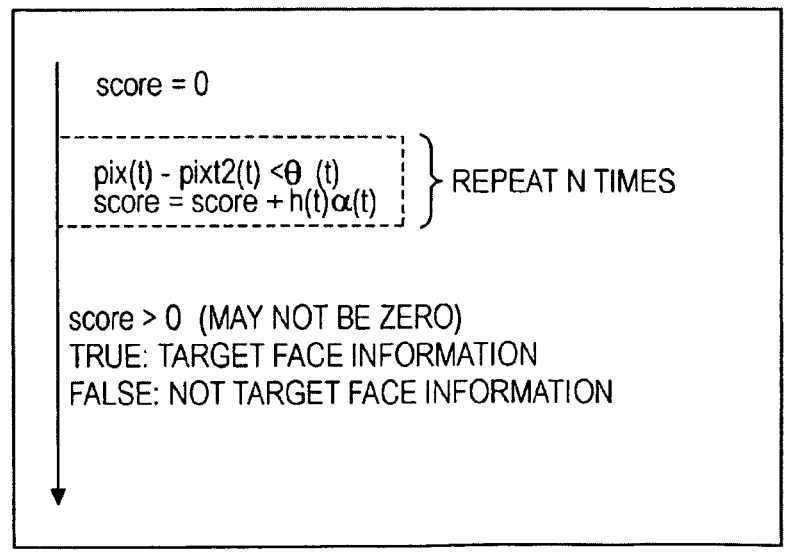
FIG. 5C is a diagram illustrating a configuration of a face part detector in the form of a pseudo program code.

FIG. 5C illustrates the configuration of a face part detector in the form of program code.

First, the value of score is initialized to zero at a scanning position.

The difference between luminance levels of the two pixels pix1($t$) and pix2($t$) for which a weak hypothesis is defined is calculated so as to determine whether the hypothesis of pix1($t$)−pix2($t$)<$\theta(t)$ is satisfied. If the weak hypothesis is true, the response of h(t)=1 is returned. If the weak hypothesis is false, the response of h(t)=−1 is returned. A value of h(t)$\alpha$(t) obtained by multiplying the weak hypothesis h(t) by the weight $\alpha(t)$ is a score for the two pixels pix1($t$) and pix2($t$). The score of h(t)$\alpha$(t) is added to score.

The above-described score calculation is repeatedly performed for each of all sets of two pixels N times. The obtained score is a score at the scanning position (N is the number of all weak hypotheses, for example, several hundreds of values).

Statistical learning is performed so that the score of an eye becomes a positive value. Accordingly, if score is a positive value, the response of true representing that the scanning position is the position of a target face part is returned. If score is not a positive value, the response of false representing that the scanning position is not the position of a target face part is returned.

Figure 5D:
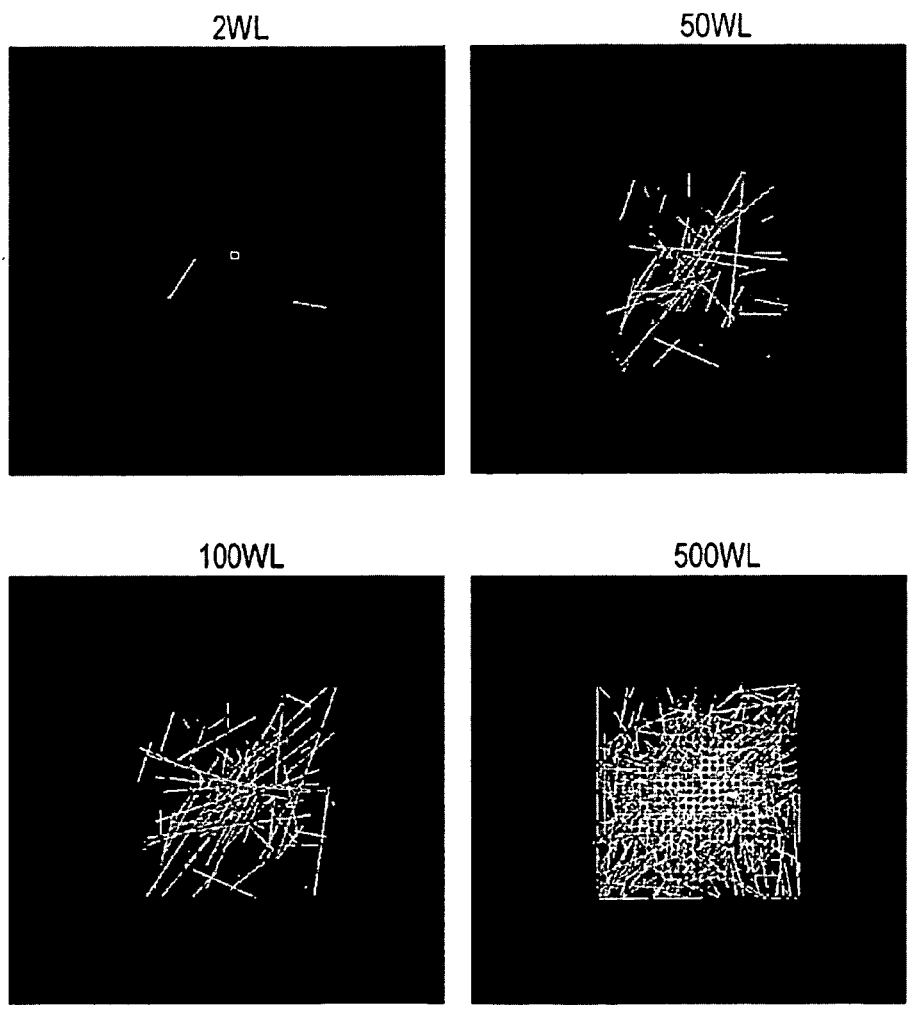
FIG. 5D is a diagram illustrating the definition of a weak hypothesis that is the difference between luminance levels of two pixels in a predetermined face part detection area in a face image.

FIG. 5D illustrates the definition of a weak hypothesis (Weak Learner: WL) that is the difference between luminance levels of two pixels in a predetermined face part detection area in a face image. In the drawing, examples in which the number of weak hypotheses is 2, 50, 100, and 500 are illustrated. It should be noted that gradation processing is performed upon a face image so as to prevent infringement on portrait rights.

As illustrated in FIGS. 5B and 5D, a face part detector, for example, a left eye detector, includes weak hypotheses that are the differences between luminance levels of two pixels in several hundreds of sets of two pixels. In order to calculate a score at a scanning position, it is necessary to obtain luminance level differences of all the sets of two pixels. If scores at all scanning positions are calculated, the large amounts of computation and memory are required.

Accordingly, the number of weak hypotheses computed by a face part detector may be reduced by statistical learning. In this embodiment, as described previously, statistical learning is performed so that the score of a target face part becomes a positive value. In this case, at the time of detection, if a positive score cannot be obtained even after the number of weak hypotheses has been increased to a certain number, a "limit value" representing that the evaluation or determination of a target face part cannot be performed even if score calculation is continued is obtained by statistical learning.

Figure 6A:
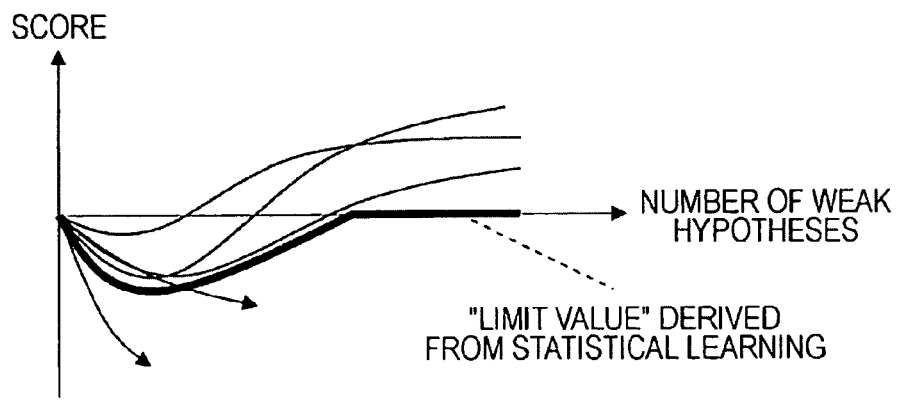
FIG. 6A is a diagram illustrating setting of a limit value on the basis of the lowest score associated with the number of weak hypotheses obtained from all pieces of input learning data.
Figure 6B:
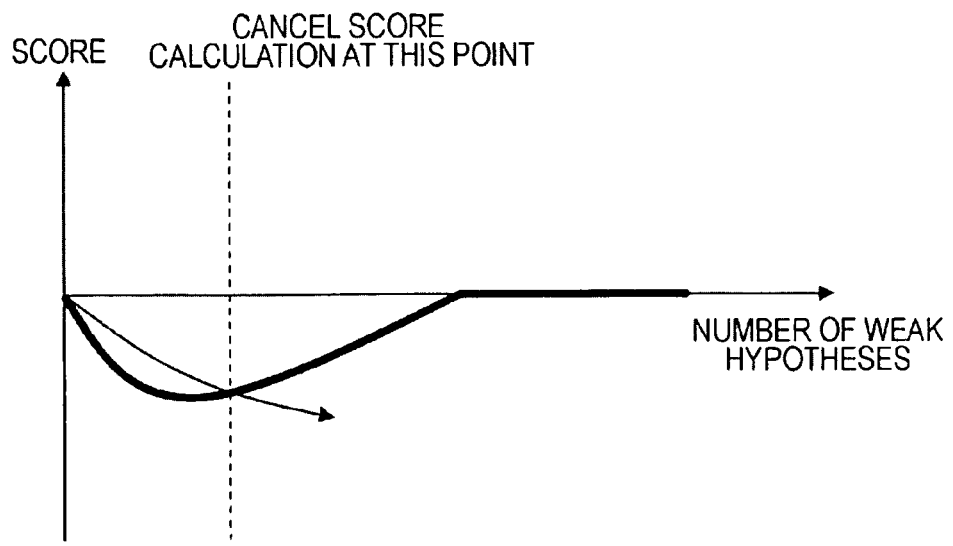
FIG. 6B is a diagram illustrating cancellation of score calculation at the number of weak hypotheses at which a score is lower than a limit value.

This limit value can be set on the basis of the lowest score associated with the number of weak hypotheses obtained from all pieces of input learning data (see, FIG. 6A). During calculation of a score at a certain scanning position, a score obtained from a certain number of weak hypotheses is compared with a corresponding limit value. If the score is lower than the corresponding limit value (see, FIG. 6B), it can be considered that the scanning position is very unlikely to be the position of a target face part. Accordingly, the subsequent score calculation is canceled, and a result representing that the scanning position is not the position of the target face part is returned.

The left eye detector is not required to scan at all points (X, Y) in the left eye detection area. By performing high-speed scanning by thinning out scanning positions at which score calculation is to be performed, a processing time required for face part detection can be reduced.

Figure 7:
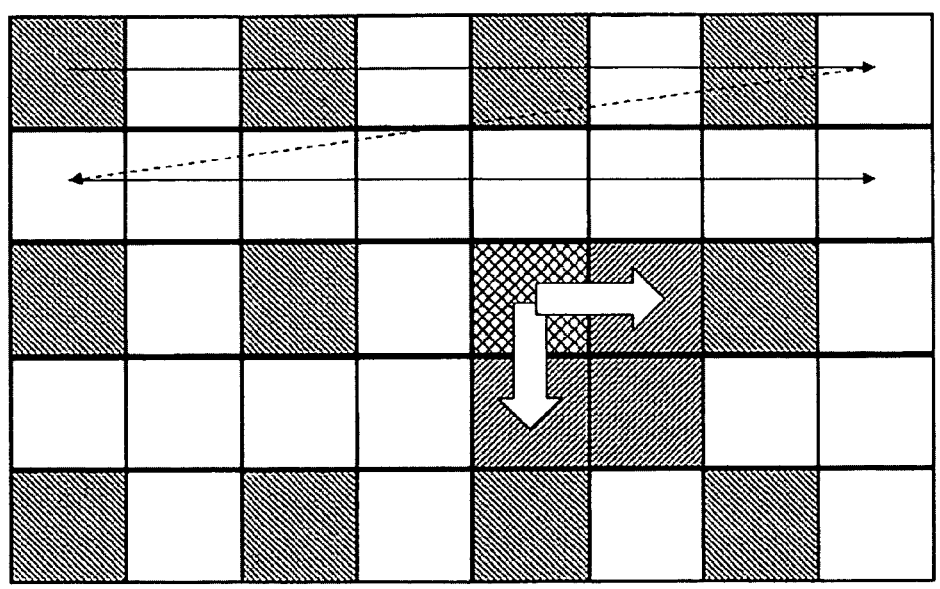
FIG. 7 is a diagram illustrating high-speed scanning performed in a face part detection area.

FIG. 7 illustrates high-speed scanning performed in a face part detection area. In the drawing, default scanning positions are indicated by left-leaning hatching. In an illustrated example, default scanning positions are set at every other point in the horizontal direction (x direction), and scanning lines (lines in which scanning is performed at every other point) are set in every other row in the vertical direction (y direction).

If a high score is calculated at a certain scanning position, there is a high possibility that the scanning position or an adjacent scanning position is the position of a target face part. However, in the above-described high-speed scanning in which scanning is performed at every other point, the granularity of face part detection is coarse.

Accordingly, if a score higher than a predetermined value is calculated at a scanning position, score calculation is also performed at positions adjacent to the scanning position, at which score calculation is not performed by default, so as to set a position having the highest positive score as the position of a target face part. As a result, a processing speed can be enhanced, and the accuracy of detection can be maintained.

In the example illustrated in FIG. 7, a scanning position at which a high score is calculated is crosshatched. At adjacent positions (indicated by right-leaning hatching), a position on the right side of the scanning position, a position below the scanning position, and a position in the lower right of the scanning position, score calculation is also performed.

By performing the high-speed scanning illustrated in FIG. 7, a target face part can be detected with one quarter the amount of computation required in a case in which score calculation is performed at all scanning positions while preventing the decrease in detection accuracy.

Examples of a face part to be detected from a face image include left and right eyes. As illustrated in FIG. 1, the face recognition face recognition system 1 is provided with the eye position detector 13 as a face part detector. On the basis of the positions of both eyes detected by the eye position detector 13, the position, size, and angle of the face image input by an input unit are normalized. The normalized face image is subjected to face recognition (described previously) performed by the face recognizer 14, or can be used for another application using a detected face (not illustrated).

Figure 8:
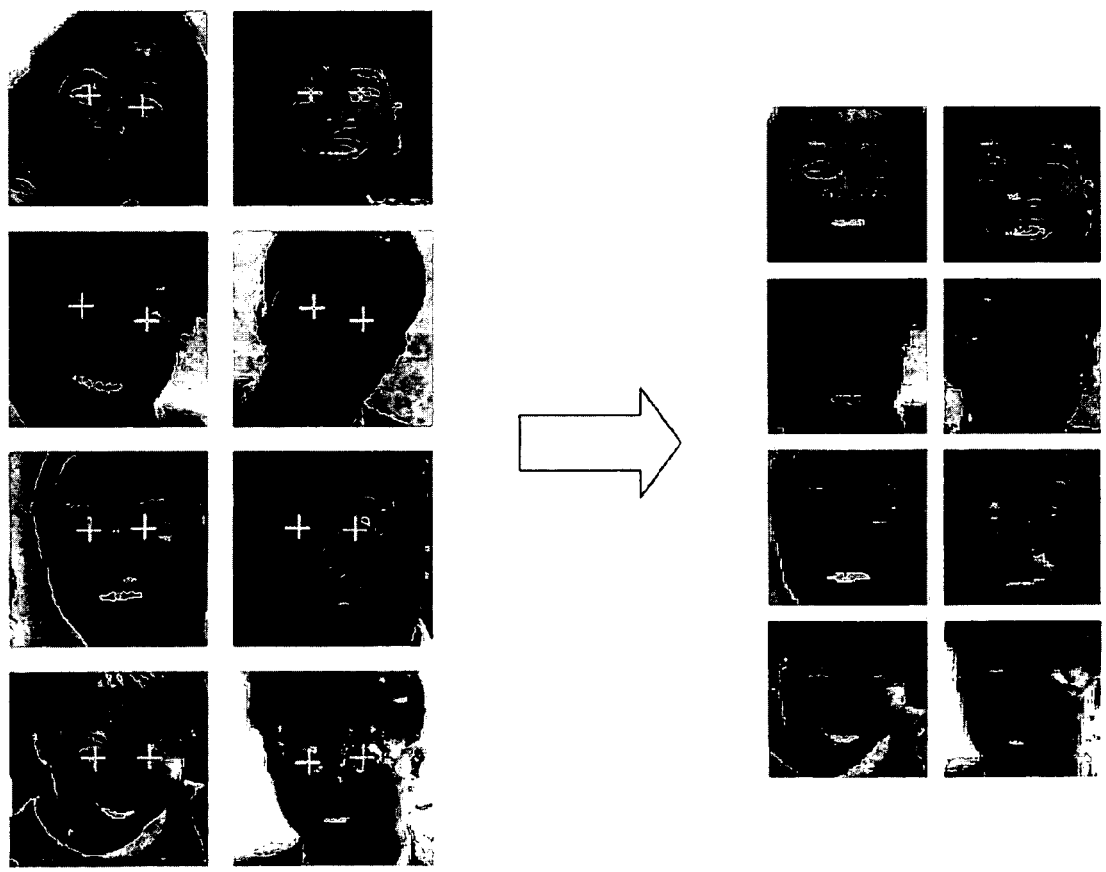
FIG. 8 is a diagram illustrating results of normalization of detected face images which is performed on the basis of the sizes of the face images, and results of normalization of positions, sizes, and angles of the normalized face images which is performed on the basis of the positions of eyes.

FIG. 8 illustrates the results of normalization of detected face images which is performed on the basis of the sizes of the face images, and the results of normalization of positions, sizes, and angles of the normalized face images which is performed on the basis of the positions of eyes in the normalized face images. It can be understood from this drawing that randomly orientated faces can be accurately aligned by performing eye detection upon each face area image and normalizing the face area image on the basis of the detection result.

It can be considered that information about the position of another face part other than both eyes is used for normalization of a face image. However, as compared with other face parts, the eyes can achieve more accurate normalization of a face image using the positions thereof, since there is little difference in the distance between left and right eyes among individuals.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for processing an image including an image of a face, comprising:
 means for changing a resolution of the image to produce a plurality of resolutions of the image and detecting the face in one of the plural resolutions of the image;
 means for determining a size of the image of the face based on the one of plural resolutions of the image in which the face was detected;
 means for normalizing, prior to detecting a position of a face part of the face and after detecting the face in one of the plural resolutions of the image, the image of the face based on the determined size of the image of the face so that a size of the face part of the face becomes a predetermined size;

means for setting an area smaller than the image normalized by the normalizing means as detection area in which a position of the face part of the face is detected; and means as a detecting area in which a position of the part in the detection area set by the means for setting, wherein means for detecting determines whether a scanning position is included in a subset of scanning positions within the detection area based on whether the scanning position is adjacent to another scanning position in the subset of scanning positions having a calculated score greater than a predetermined threshold.

2. The image processing apparatus according to claim 1, wherein the means for detecting defines a difference between luminance levels of at least two pixels included in the detection are as a weak hypothesis, and detects the position of the face part using a final hypothesis defined using weak hypotheses obtained in advance by statistical learning.

3. The image processing apparatus according to claim 2, wherein the means for detecting sets a plurality of sets of at least two pixels between which there is a luminance level difference allowing extraction of a face part, calculates a different between luminance levels of two pixels included in each of the plurality of sets of at least two pixels, and defines a calculation result as a weak hypothesis for the two pixels.

4. The image processing apparatus according to claim 3, wherein, at each scanning position in the subset of scanning positions, the means for detecting calculates a difference between luminance levels of two pixels which are included in each of the plurality of sets of at least two pixels and for which the weak hypothesis is defined, determines whether a calculation result matches the weak hypothesis for the two pixels, determines a score for the two pixels on the basis of the determination result, and determine whether the scanning position is the position of the face part on the basis of the sum of the scores for all the plurality of sets of at least two pixels.

5. The image processing apparatus according to claim 4, wherein the statistical learning is performed so that a score of a target face part becomes a positive value, and wherein the detecting means determines that one of all the scanning positions having the highest positive score is the position of the target face part.

6. The image processing apparatus according to claim 5, further comprising setting means for setting a score limit value on the basis of the lowest score associated with the number of weak hypotheses obtained from all pieces of learning data used for the statistical learning, and wherein, during score calculation at a certain scanning position, when a score obtained from a certain number of weak hypotheses is lower than a corresponding limit value, the detecting cancels the score calculation.

7. The image processing apparatus according to claim 6, wherein the means for detecting returns a result representing that the certain scanning position is not the position of the target face part.

8. The image processing apparatus according to claim 4, wherein, in the detection area, the detecting means performs high-speed scanning by determining a score for only scanning positions included in the subset of scanning positions.

9. The image processing apparatus according to claim 1, wherein the face part is each of left and right eyes, and, wherein the normalizing performs normalization on the basis of positions of the left and right eyes which are detected by the means for detecting.

10. An image processing method of processing an image including an image of a face, comprising:

changing a resolution of the image to produce a plurality of resolutions of the image and determine the face in one of the plural resolutions of the image;

determining the size of the image of the face based on the one of plural resolutions of the image in which the face was detected;

normalizing, prior to detecting a position of a face part of the and after detecting the face in one of the plural resolutions of the image, the image of the face based on the determined size of the image of the face so that a size of the face part of the becomes a predetermined size;

setting an area smaller than the normalized image as a detection are in which a position of the face part of the face is detected;

determining whether a scanning position is included is a subset of scanning positions within the detecting area based on whether the scanning positions is adjacent to another scanning position in the subset f scanning positions having a calculated score greater than a predetermined threshold; and detecting the position of the face part in the detecting area.

11. An image processing apparatus for processing an image including an image of a face, comprising:

means for changing a resolution of the image to produce a plurality of resolutions of the image and detecting the face in one of the plural resolutions of the image;

means for determining a size of the image of the face based on the one of plural resolutions of the image in which the face was detected;

means for normalizing, prior to detecting a position of a face part of the face and after detecting the face in one of the plural resolutions of the image, the image of the faced based on the determined size of the image of the face so that a size of the face part the face becomes a predetermined size;

means for setting a plurality of sets of at least two pixels included in a detection area in which a position of the face part of the face is detected, calculating a difference between luminance levels of two pixels included in each of the plurality of sets of at least two pixels, and defining the calculation result as a weak hypothesis for the two pixels;

means for determining whether a scanning position is included in a subset of scanning positions within the detection area based on whether the scanning position is adjacent to another scanning position in the subset of scanning positions having a score greater than a predetermined threshold; and means for, at each scanning position within the subset of scanning positions in the detection area, calculating a difference between luminance levels of the two pixels which are included in each of the plurality of sets of at least two pixels and for which the weak hypothesis is defined, determining whether the calculation result matches the weak hypothesis for the two pixels, determining a score for the two pixels on the basis of the determination result, and determining whether the scanning position is the position of the face part on the basis of the sum of the score for all the plurality of sets of at least two pixels.

12. An image processing method of processing an image including an image of a face, comprising:

changing a resolution of the image to produce a plurality of resolutions of the image and detecting the face in one of the plural resolutions of the image;

determine a size of the image of the face based on the one of plural resolutions of the image in which the face was detected;

normalizing, prior to detecting a position of a face part of the face and after detecting the face in one of the plural resolutions of the image, the image of the face based on the determined size of the image of the face so that a size of the face part of the face becomes a predetermined size;

setting a plurality of sets of at least two pixels included in a detection area in which a position of the face part of the face is detected, calculating a difference between luminance levels of two pixels included in each of the plurality of sets of at least two pixels, and defining the calculation result as a weak hypothesis for the two pixels;

determining whether a scanning position is included in a subset of scanning positions within the detection area based on whether the scanning position is adjacent to another scanning position in the subset of scanning positions having a score greater than a predetermined threshold; and calculation, at each scanning position within the subset of scanning positions in the detection area, a difference between luminance levels of the two pixels which are included in each of the plurality of sets of at least two pixels and for which the weak hypothesis is defined, determining whether the calculation result matches the weak hypothesis for the two pixels, determining a score for the two pixels on the basis of the determination result, and determining whether the scanning position is the position of the face part on the basis of the sum of the scores for all the plurality of sets of at least two pixels.

13. An image processing apparatus for processing an image including an image of a face, comprising:

a face detection unit, including a processor, configured to change a resolution of the image to produce a plurality of resolutions of the image and to detect the face in one of the plural resolutions of the image;

a determining unit, including a processor, configured to determine a size of the image of the face based on the one of plural resolutions of the image in which the face was detected;

a normalization unit, including a processor, configured to normalize, prior to detecting a position of a face part of the face and after detecting the face in one of the plural resolution of the image, the image of the face based on the determined size of the image of the face so that a size of the face part of the face becomes a predetermined size;

a detection area setting unit, including a processor, configured to set an area smaller than the image normalized by the normalization unit as a detection area in which a position of the face part of the face is detected; and a detection unit, including a processor, including a memory and configured to detect the position of the face part in the detection area set by detection area setting unit, wherein the detection unit determines whether a scanning position is included in a subset of scanning position within the detection area based on whether the scanning position is adjacent to another scanning position in the subset of scanning positions having a calculated score greater than a predetermined threshold.

14. An image processing apparatus for processing an image including an image of a face, compromising:

a face detection unit, including a processor, configured to change a resolution of the image to produce a plurality of resolution of the image and detected the face in one of the plural resolutions of the image;

a determining unit, including a processor, configured to determine a size of the image of the face based on the one of plural resolution of the image in which the face was detected;

a normalization unit, including a processor, configured to normalize, prior to detection a position of a face part of the face and after detecting the face in one of the plural resolution of the image, the image of the face based on the determined size of the image of the face so that a size of the face part of the face becomes a predetermined size;

a defining unit, including a processor, configured to set a plurality of sets of at least two pixels included in a detection area in which a position of the face part of the face is detected, calculate a difference between luminance levels of two pixels included in each of the plurality of sets of at least two pixels, and define the calculation result as a weak hypothesis for the two pixels; and a detection unit including a memory and configured to
determine whether a scanning position is included in a subset of scanning positions within the detection area based on whether the scanning position is adjacent to another scanning position in the subset of scanning positions having a score greater than a predetermined threshold, and
at each scanning position within the subset of scanning positions in the detection are, calculate a different between luminance levels of the two pixels which are included in each of the plurality of sets of at least two pixels and for which the weak hypothesis is defined, determine whether the calculation result matches the weak hypothesis for the two pixels, and determine whether the scanning position is the position of the face part on the basis of the sum of the scores for all the plurality of sets of at least two pixels.

15. The image processing apparatus according to claim 14, wherein the detection unit identifies a scanning position as being included in the subset of scanning positions if the scanning position is included in a predetermined pattern of scanning positions within the detection area or if the scanning position is adjacent to a scanning position within the predetermined pattern having a score greater than the predetermined threshold.

16. The image processing apparatus according to claim 14, wherein each scanning position includes a square array of pixels smaller in area than the detection area.

17. The image processing apparatus according to claim 13, wherein the detection unit determines the size of the face, a face position, and a face angle based on the detected position of the face part.

18. The image processing apparatus according to claim 1, wherein
default scanning positions are set at every other point in a horizontal direction and lines in which scanning is performed at every other point are set in every other row in a vertical direction,
the means for detecting sets a plurality of sets of at least two pixels between which there is a luminance level difference allowing extraction of a feature of a face part, calculates a difference between luminance levels of two pixels included in each of the plurality of sets of at least two pixels, and defines a calculation result as a weak hypothesis for the two pixels, and
a group of defined weak hypotheses is registered as a face part detection dictionary.

19. The image processing method according to claim 10, wherein
 default scanning positions are set at every other point in a horizontal direction and lines in which scanning is performed at every other point are set in every other row in a vertical direction,
 the detecting includes setting a plurality of sets of at least two pixels between which there is a luminance level difference allowing extraction of a feature of a face part, calculating a difference between luminance levels of two pixels included in each of the plurality of sets of at least two pixels, and defining a calculation result as a weak hypothesis for the two pixels, and
 a group of defined weak hypotheses is registered as a face part detection dictionary.

20. The image processing apparatus according to claim 11, wherein
 default scanning positions are set at every other point in a horizontal direction and lines in which scanning is performed at every other point are set in every other row in a vertical direction,
 the means for calculation sets a plurality of sets of at least two pixels between which there is a luminance level different allowing extraction of a feature of a face part, calculates a difference between luminance levels of two pixels included in each of the plurality of sets of at least two pixels, and defines a calculation result as a weak hypothesis for the two pixels, and
 a group of defined weak hypotheses is registered as a face part detection dictionary.

21. The image processing apparatus according to claim 12, wherein
 default scanning positions are set at every other point in a horizontal direction and lines in which scanning is performed at every other point are set in every other row in a vertical direction,
 the setting includes setting a plurality of sets of at least two pixels between which there is a luminance level different allowing extraction of a face part, calculates a different between luminance levels of two pixels included in each of the plurality of sets of at least two pixels, and defines a calculation result as a weak hypothesis for the two pixels, and
 a group of defined weak hypotheses is registered as a face part detection dictionary.

22. The image processing apparatus according to claim 13, wherein
 default scanning positions are set at every other point in a horizontal direction and lines in which scanning is performed at every other point are set in every other row in a vertical direction,
 the detection unit sets a plurality of sets of at least two pixels between which there is a luminance level difference allowing extraction of a face part, calculates a difference between luminance levels of two pixels included in each of the plurality of sets of at least two pixels, and defines a calculation result as a weak hypothesis for the two pixels, and
 a group of defined weak hypothesis is registered as a face part detection dictionary.

23. The image processing apparatus according to claim 14, wherein
 default scanning positions are set at every other point in a horizontal direction and lines in which scanning is performed at every other point are set in every other row in a vertical direction,
 the detection unit sets a plurality of sets of at least two pixels between which there is a luminance level difference allowing extraction of a face part, calculates a difference between luminance levels of two pixels included in each of the plurality of sets of at least two pixels, and defines a calculation result as a weak hypothesis for the two pixels, and
 a group of defined weak hypothesis is registered as a face part detection dictionary.

* * * * *